(12) United States Patent
Pilu

(10) Patent No.: US 7,633,527 B2
(45) Date of Patent: Dec. 15, 2009

(54) ATTENTION DETECTION

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 10/822,696

(22) Filed: Apr. 13, 2004

(65) Prior Publication Data

US 2004/0208496 A1 Oct. 21, 2004

(30) Foreign Application Priority Data

Apr. 15, 2003 (GB) .................................. 0308739.2

(51) Int. Cl.
*H04N 5/232* (2006.01)
(52) U.S. Cl. .................................. 348/211.4; 455/566
(58) Field of Classification Search .............. 348/211.4; 455/566.1
See application file for complete search history.

(56) References Cited

U.S. PATENT DOCUMENTS

| | | | | |
|---|---|---|---|---|
| 6,031,915 | A * | 2/2000 | Okano et al. .................. 381/56 |
| 6,563,532 | B1 * | 5/2003 | Strub et al. .................. 348/158 |
| 6,567,502 | B2 * | 5/2003 | Zellner et al. .................. 379/45 |
| 6,616,607 | B2 * | 9/2003 | Hashimoto et al. .......... 600/300 |
| 6,825,875 | B1 * | 11/2004 | Strub et al. ............. 348/207.99 |
| 6,997,556 | B2 * | 2/2006 | Pfleger ........................ 351/246 |
| 2002/0057915 | A1 * | 5/2002 | Mann .......................... 396/661 |
| 2002/0080094 | A1 * | 6/2002 | Biocca et al. ................... 345/8 |
| 2002/0101505 | A1 * | 8/2002 | Gutta et al. .............. 348/14.07 |
| 2002/1010364 |  * | 8/2002 | Basson et al. ................ 704/270 |
| 2002/0140822 | A1 * | 10/2002 | Kahn et al. ............ 348/207.99 |
| 2002/0149681 | A1 * | 10/2002 | Kahn et al. ............ 348/211.99 |
| 2003/0021601 | A1 | 1/2003 | Goldstein |
| 2004/0101178 | A1 * | 5/2004 | Fedorovskaya et al. ..... 382/128 |

FOREIGN PATENT DOCUMENTS

| | | |
|---|---|---|
| EP | 0846440 | 6/1998 |
| EP | 2379987 | 7/2002 |
| EP | 1246146 | 10/2002 |
| JP | 2001036800 | 2/2001 |
| JP | 2002244197 | 2/2001 |

OTHER PUBLICATIONS

Mann, Humanistic Computing: 'WearComp' as a New Framework and Application for Intelligent Signal Processing, Nov. 1998, Proceedings of the IEEE, vol. 86 No. 11, pp. 2123-2151.*

* cited by examiner

*Primary Examiner*—Lin Ye
*Assistant Examiner*—Chia-Wei A Chen

(57) ABSTRACT

An attention detection system comprises a portable attention detection module for receiving attention clues of a host person. The attention clues are generated from a self perspective of the host. Attention clues of the host person generated from an observer perspective are received. A sensor device generates signals relating to the attention clue signals of the self perspective. At least one sensor generates signals relating to the attention clue signals of the observer perspective. The attention detection module determines a situation of raised attention of the host wearer from the self perspective attention clues and the received observer perspective attention clues.

53 Claims, 13 Drawing Sheets

ATTENTION DETECTION

FIELD OF THE INVENTION

The present invention relates to detection of an attention state of at least one animate object and particularly, although not exclusively, to a method and apparatus for autonomously collecting images.

BACKGROUND TO THE INVENTION

Known camera technology, including cameras of the conventional film type, and digital cameras, consumer type cameras and professional type cameras, are based upon a usage model which requires a human photographer to point the camera at a field of view containing a subject of which a picture, image or video is to be captured, and activating a trigger button causing the camera to capture a still image, or in the case of a video camera, a moving picture scene.

Known still image cameras and video/film cameras for consumer and professional use are effectively products which are used by a photographer to capture an image or moving sequence of a scene, where the photographer consciously selects the scene, sets up the camera positioning for a particular view, and activates capture of an image or sequence of images as a photographer controlled activity.

In some cases, automatic triggers are provided on a timer device, whereby the photographer can set a camera up pointing at a scene, activate a time delay trigger, giving the photographer time to enter the scene, and then the camera automatically takes a picture or sequence once the pre-determined time limit has elapsed, allowing the photographer to appear in her own images.

There are also known prior art surveillance camera systems, which automatically capture still images or video sequences. Such cameras are used for security purposes in commercial premises such as factories and offices, as well as in domestic environments for security. These known cameras capture images or sequences of images in response to sensor activated events, such as an infra-red sensor being triggered, a movement sensor, or a circuit breaker sensor, for example a sensor which is activated when a door or window is opened. In general, this type of camera is wall mounted or mounted on posts, and pre-arranged to take a picture of a pre-determined scene. The cameras are not mobile and provide a permanent security monitoring installation.

In some cases, surveillance cameras are directable remotely from a central console unit, so that they can pan across a field of view and focus in and out of that field of view by remote control, the cameras being moved and controlled by servomotors.

There are also known surveillance cameras for other uses, for example traffic monitoring, and speed detection, which are triggered by motion sensors which detect vehicles moving within pre-set speed limits. This type of camera is conventionally installed in a permanent installation, pointing at a pre-determined scene.

The known surveillance cameras and traffic monitoring cameras are at fixed installations which operate without a human photographer, but are limited in their fields of view.

More recently, compact cameras have been installed in personal communication devices, such as mobile phones. Pictures of individuals can be taken using hand held devices, and sent as messages over a wireless communication network to personal handsets of other users. With these hand held devices, the basic mode of usage requires a person to act as a photographer, pointing the device at a field of view, for example directing the device at their own face to take a picture of themselves, and activating capture of an image by triggering a switch.

The concept of a user wearable camera device receiving attention clues from a host wearer and capturing images is known. For example in *Summarizing Wearable Video, K. Aizawa, K. Ishijima, M. Shiina*, IEEE, International conference on image processing, III:398-401, Thessaloniki, Greece, 2001, there is disclosed a system which receives sensor inputs from a host wearer, and which attempts to understand those sensor inputs in order to determine when to capture an image.

Other known works which analyze a host wearer's attention from a self perspective point of view include the following:

J. Healey and R. W. Picard, "StartleCam: A Cybernetic Wearable Camera", *In Proceedings of the International Symposium on Wearable Computers*, pages 42-49, 1998;

A. Lockerd, F. Mueller, "*LAFcam—Leveraging Affective Feedback Camcorder*", ACM CHI, 2002; and Y. Nakamura, J. Ohde, Y. Otha, "Structuring personal activity records based on attention: Analysing vidoes from a head-mounted camera", in *International Conference Pattern Recognition*, Barcelona, September 2000.

Known usage models and systems for detecting a person's attention focus on analyzing the actions and behavior of the person from the perspective of that person, that is, analyzing parameters which are local to the person and in the immediate vicinity of the person.

A further body of work concerned with observing a person from a position external of that person, that is from an external perspective includes the following items:

A. Pentland, "*Looking at People: Sensing for Ubiquitous and Wearable Computing*, IEEE Trans. Pattern Analysis and Machine Intelligence, IEEE CS Press, Los Alamitos, Calif., January 2000, pp.107-118;

M. Trivedi, I. Mikic, S. Bhonsle, "Active Camera Networks and Sematic Event Databases for Intelligent Environments", IEEE Workshop on Human Modeling, Analysis and Synthesis, June 2000;

A. Pentland, T. Choudhury. "Face Recognition for Smart Environments",*IEEE Computer*, vol. 33, no. 2, February 2000, pp. 50-55;

D. Gavrila, "The Visual Analysis of Human Movement: A Survey", *Computer Vision and Image Understanding*, vol. 73, no.1, January 1999, pp. 82-98;

V. Pavlovic, R. Sharma, T. Huang, "Visual Interpretation of Hand Gestures for Human-Computer Interaction: A Review". IEEE Trans. PAMI, vol. 19, no. 7, July 1997, pp. 677-695;

R. Stiefelhagen, J. Yang, A. Waibel, "Estimating focus of attention based on gaze and sound", *Proceedings of the Workshop on Perceptive User Interfaces,* 2001; and R. Vertegaal, R. Slagter, G. van der Veer, A. Nijholt, "Why conversational agents should catch the eye", *In Summary of ACM CHI Conference on Human Factors in Computing*, The Hague, 2000.

Some known devices such as disclosed in the above bodies of work could be referred to as 's', which observe a person from a position external of that person.

SUMMARY OF THE INVENTION

A first aspect of the present invention relates to autonomous image capture, and the detection of situations of interest to users of cameras, in order to trigger automated image capture without conscious human user activation of a camera device. Embodiment of the invention provide an autonomous wearable camera system which is able to capture images of moments by inferring situations of interest to persons.

Further embodiments may provide for the use of a detector device which is able to interpret 'attention clues' given out by human persons, the attention clues being used to activate one or more image capture devices for capture of images when the attention clues are detected. The device may be provided as one or more firmware devices, or as a software agent. Specific embodiments herein aim to provide a system for autonomously determining a situational saliency based upon the attention clues, in order to trigger capture of one or a set of images of that situation.

In one embodiment, a user carries a wearable camera. The detector device may be situated on the wearer's body. In other embodiments, the detector device may be situated elsewhere, or the detector device may be distributed.

If the detector device is worn by a person carrying a camera, the detector device may be capable of adopting a 'self-perspective' mode, in which the detector device observes situations from the perspective of a host person who is wearing an image capture device. In this mode, the detector device may receive attention clues in the form of sensor signals of parameters of the wearer, for example skin conductivity, body movement, or voice utterances made by the host wearer. In the self-perspective mode, since the detector device is in close proximity to a person. In order to capture images in the self perspective mode, the detector device requires inputs from sensors strategically placed on the host person, including limb positioning sensors, eye trackers, and the like.

The detector device combines information collected about the host wearer in the self perspective mode with externally received information collected about the same host wearer or similar or complimentary device which has collected information in an 'external' perspective mode. The detector device determines from the combination of self perspective attention clues and external perspective attention clues whether the host wearer is experiencing a situation in which his attention is raised to a level where recording of an environmental situation in which the user finds themselves would be of interest to that user.

In an 'external' perspective mode, a detector device may analyze another person's body language and attention clues from a perspective external to the person, that is, as an entity remote from the person and observing the person. The detector device may be physically positioned away from that other person, and may observe that other person. In this mode, the detector device may detect externally detectable attention clues given out by the other person, for example limb movements, pointing of a finger, movement of eye look direction, rapid reorientation of a head of the person, aspects of the other persons body posture, and like attention indicating body language signals.

According to one aspect of the present invention, there is provided an attention detection system comprising:

a portable attention detection module capable of receiving attention clues of a host person, said attention clues generated from a self perspective of said host person, and receiving attention clues of said host person generated from an observer perspective;

at least one sensor device capable of generating signals relating to said attention clue signals of said self perspective; and at least one sensor device capable of generating signals relating to said attention clue signals of said observer perspective;

wherein said attention detection module is capable of determining a situation of raised attention of said host wearer from said self perspective attention clues, and said received observer perspective attention clues.

Other aspects of the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE DRAWING

There will now be described by way of example a specific mode contemplated by the inventors for carrying out the invention. In the following description numerous specific details are set forth in order to provide a thorough understanding. It will be apparent however, to one skilled in the art, that the present invention can be practised without limitation to these specific details. In other instances, well known methods and structures have not been described in detail so as not to unnecessarily obscure the description.

Figure 1:
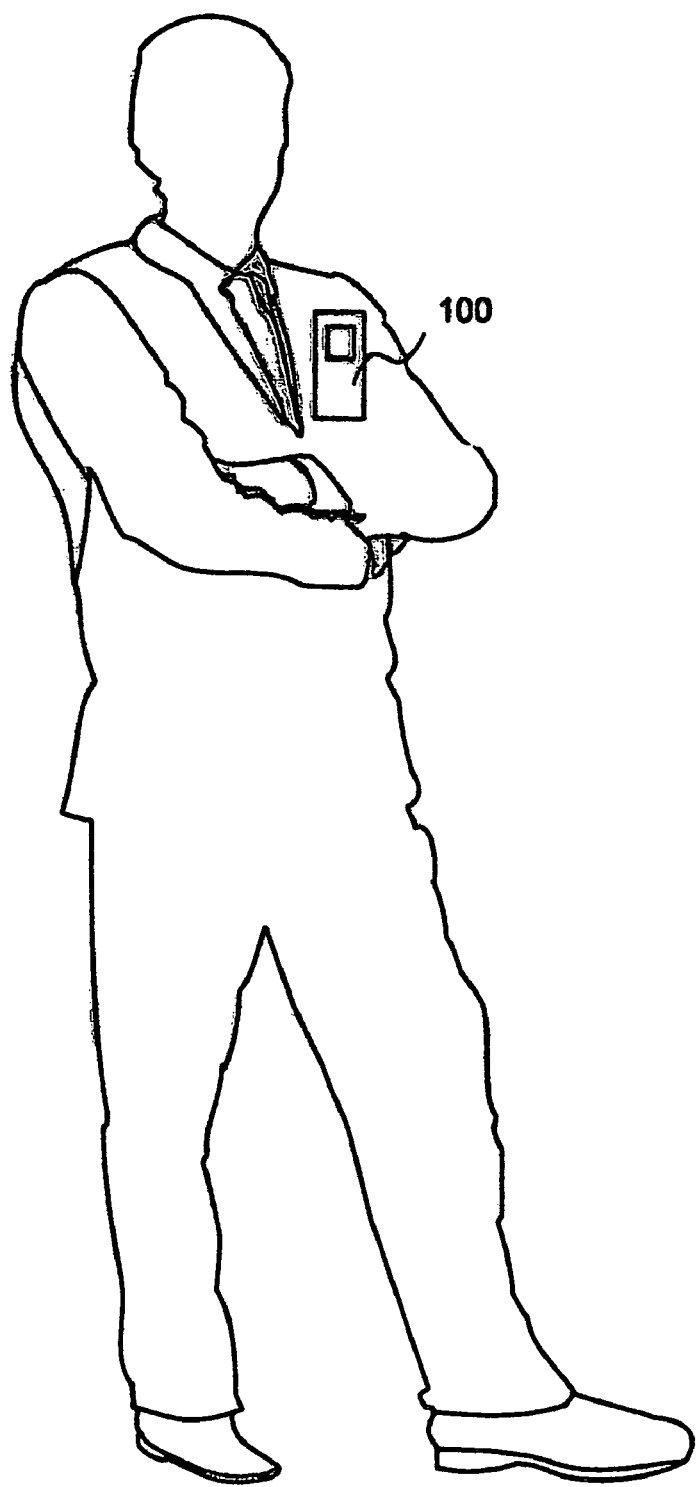
FIG. 1 is a schematic diagram of one embodiment of a personal image capture device worn by a host person.

FIG. 1 is a schematic illustration of a person carrying a portable image capture device 100 capable of capturing images of a scene in a field of view of the image capture device. Typically, the image capture device 100 comprises a digital camera having a charge coupled device (CCD) array.

The image capture device 100 can be activated remotely by a wireless signal from a remote transmitter, in order to capture an image. The image capture device 100 can also be activated by signals generated by local sensors worn on the person's body.

The portable image capture device 100 includes an attention detection module (ADM) which receives attention information indicating an attention level of the host wearer from a device external of the host wearer.

The attention detection module communicates with at least one external people-observing device, such that the attention detection module combines self perspective information received directly from the host wearers body, with observer perspective information concerning the host wearer, which is received from the external people-observing device, in order to determine a condition under which the host wearer is experiencing a situation in which the wearer's attention is raised. In response to such a condition, the attention detection module activates capture of a still image, image sequence, or capture of another like media, from a host perspective.

Whilst an image capture device 100 is described herein, with reference to the first embodiment of FIG. 1, attention clues of the host wearer can be used for capturing any other media type, for example including but not limited to audio data, still images, video sequences, pressure or temperature changes, or other changes in environmental parameters which are experienced from the perspective of the host person.

Figure 2:
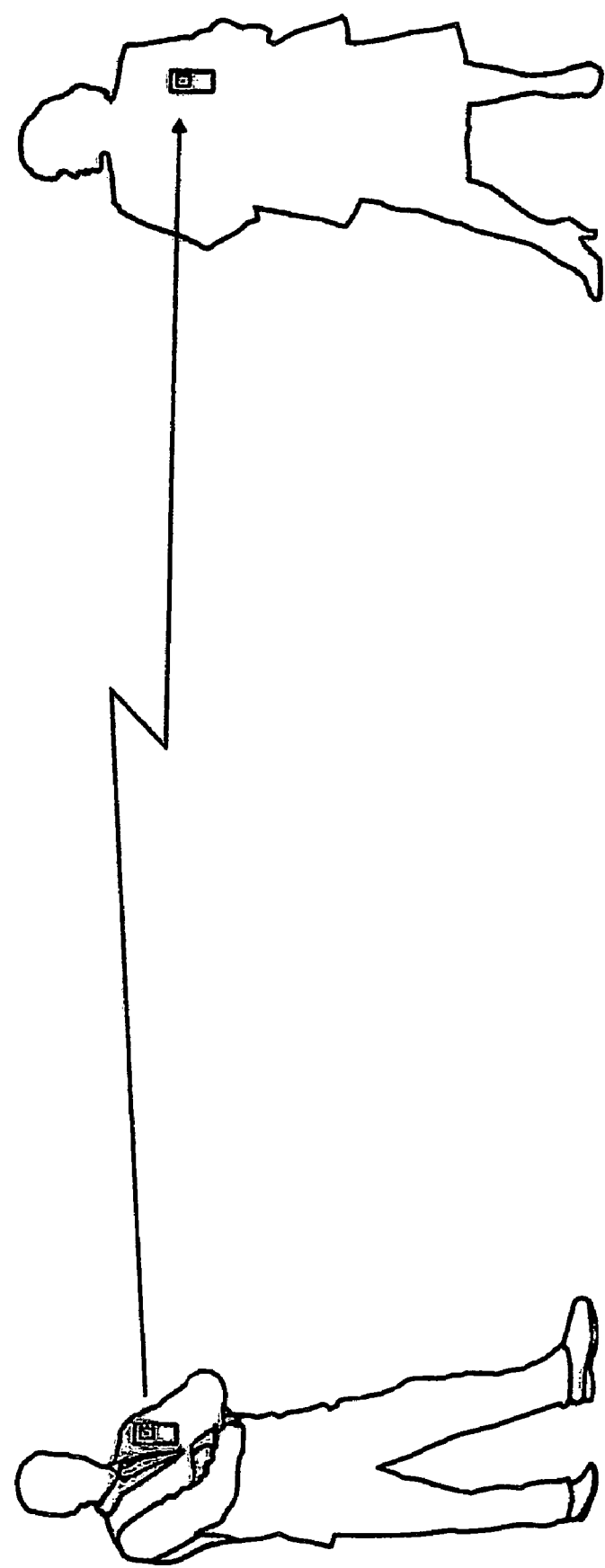
FIG. 2 is a schematic diagram of one embodiment of an image capture system comprising a plurality of image capture devices, each worn by a corresponding host person.

FIG. 2 is a schematic illustration of how to use an image capture system in which two individual users 201 and 202 are in proximity to each other. Users 201 and 202 respectively carry portable image capture devices 203 and 204. Each of devices 203 and 204 includes a detector device capable of observing a host person wearing the image capture device, as well as observing other persons. The users 201 and 202 are close enough to each other such that (1) image capture device 203 of user 201 can capture a still or moving image of user 202, and (2) capture devices 203 and 204 can communicate with each other over a wireless link, for sending and receiving activation signals for activating capture of an image.

In this situation, users 201 and 202 interact with each other using body language, such as waving, smiling, laughing, gesticulating, and/or adopting postures. Body language signals are collected through a system of sensors on devices 203 and 204. The sensors supply input attention signals into a people observing device (POD) comprising the detector device. The detector device converts the attention signals into attention clue data. Devices 203 and 204 process the attention clue data obtained from the other person to determine whether the body language of the other person indicates there is enough interest in the first person, that capture of an image of a second person may be appropriate. If the saliency of the situation is high enough that capture of an image is appropriate, then one or more image capture signals is generated for activating one or more image capture devices to capture one or more images.

In the situation illustrated in FIG. 2, a range of attention clues is collected, both from a self perspective, and from an external observer perspective, concerning the body language and behavior of the first host user 201. Self perspective attention clues, for example body movement, breathing rate, heart rate, blood pressure, skin resitivity, direction of motion and the like are measured by sensors worn by the second host user 202. However other attention clues which are available from an observer perspective, but which are difficult to assess from a self perspective are provided by the attention detection module which is external of the host wearer of the image capture device. Such attention clue information include parameters such as overall body posture, eye gaze direction, facial expression, overall body motion, or limb motion such as waving, pointing location of the host wearer with respect to other objects in an environment or the like which are best observed from a position external of a person.

The attention detection modules 203 and 204 carried or worn by the host users 201-202 assimilate both sets of attention information, that is, the self perspective and observer perspective attention clues, to determine a state of attention of the host user 201 or 202 of the attention detection module.

Figure 3:
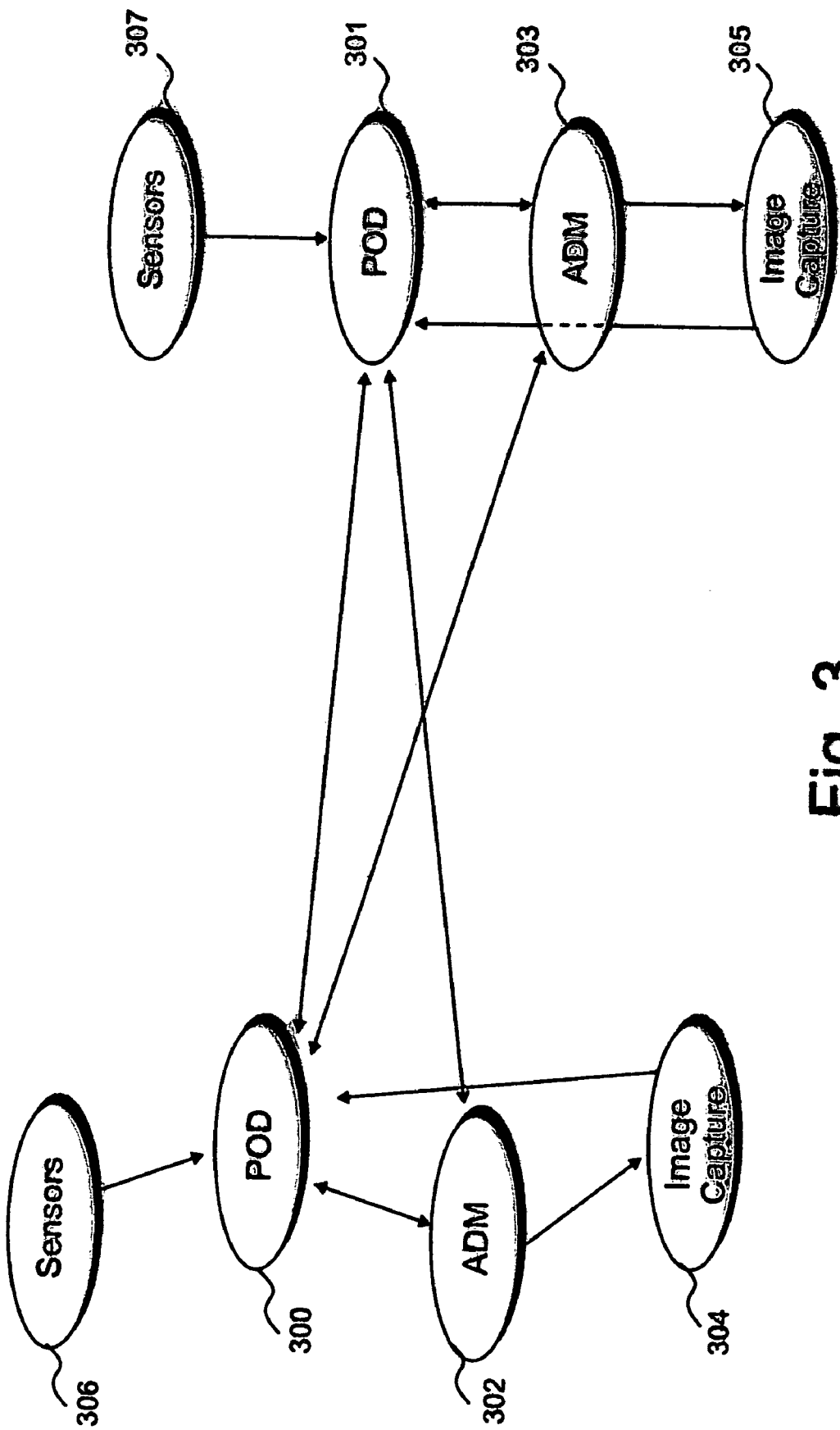
FIG. 3 is a flow diagram of logical entities of a specific image capture system.

Referring to FIG. 3, there is shown schematically in a general case logical entities present in an image capture system according to a specific embodiment of the present invention. The logical entities comprise a plurality of PODs 300, 301; a plurality of attention detection modules 302, 303; a plurality of image capture devices 304, 305; and a plurality of sensors 306, 307.

In this example users 201 and 202 respectively carry PODs 300, 301; an attention detection module (ADM) 302, 303; and an image capture device 304, 305. However, in the general case, the location of the PODs, and attention detection modules need not be restricted to being worn by human persons. Similarly, although in many embodiments sensors are worn by persons, in the general case, sensors can be located remotely from people, for example mounted on walls or posts, for observing persons remotely.

Each module 302, 303 comprises a set of algorithms for detecting attention dues exhibited by a host wearer of a particular image capture system. Each people observing device 300, 301 receives signals from one or a plurality of sensors 306, 307 respectively.

Each attention detection module 302, 303 comprises one or more algorithms for analyzing attention clues relating to the host wearer of a particular image capture device, and for analyzing attention clues received externally from other attention detection modules relating to attention clues exhibited by one or more other attention detection modules.

Figure 4:
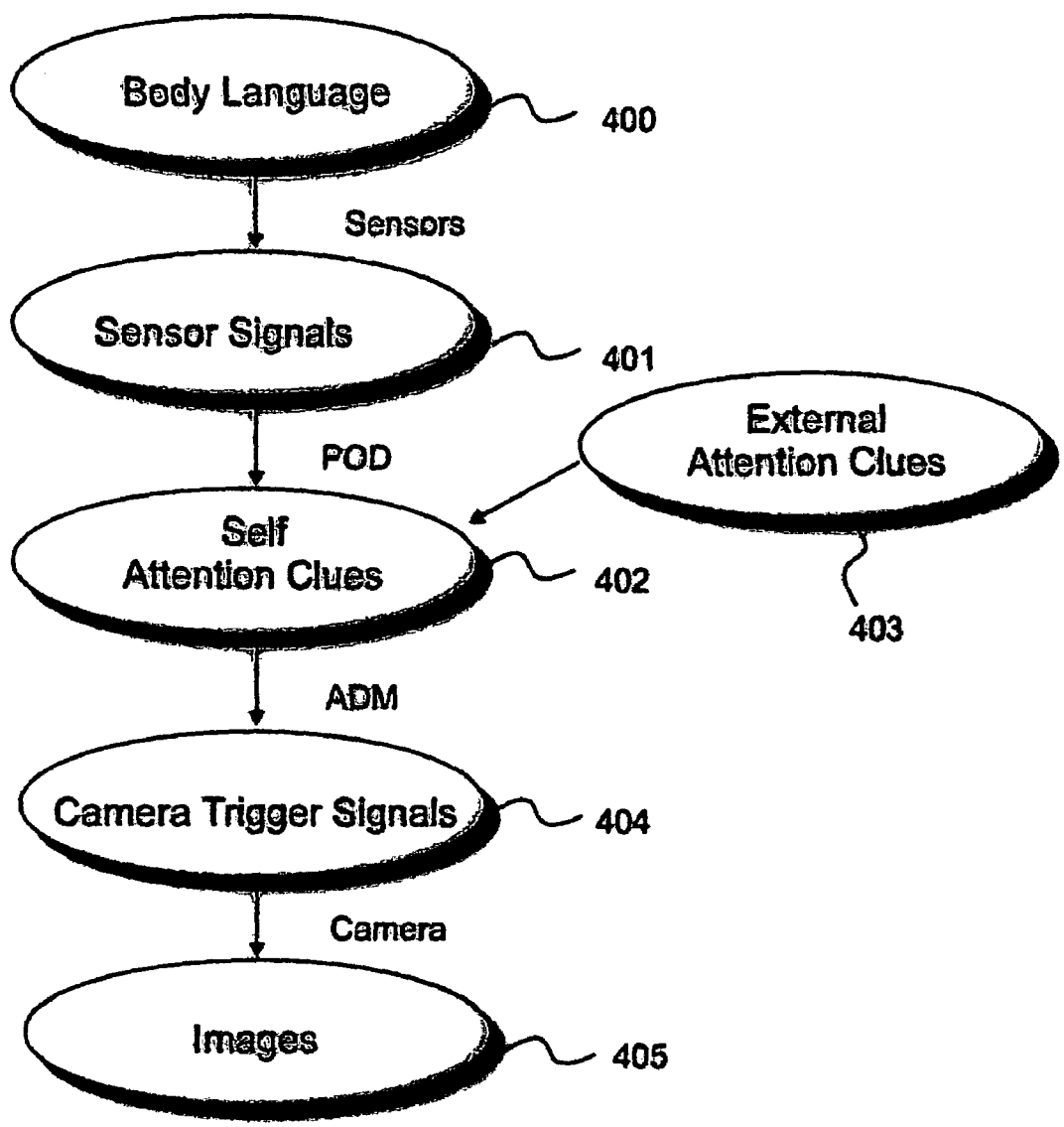
FIG. 4 is a flow diagram of how information is processed in the image capture system of FIG. 3.

Referring to FIG. 4, there is illustrated schematically information processing stages shown in the image capture system of FIG. 3 herein.

Body language information 400 exhibited by the persons carrying or in proximity to an attention detection module is detected by one or more sensors of the module. The sensors generate sensor signals 401, which comprise signals, sensing various parameters, for example movement, sound, 2-dimensional images and the like. The sensor signals are supplied to an attention detection module (ADM), which analyses the sensor signals to determine a set of self attention clues 402 collected from a self perspective. Attention clues comprise data which indicate that the attention of the host wearer person has been raised. The attention clues are input into the attention detection module. The attention detection module also receives external attention clues 403 relating to the host wearer person as generated by an external people-observing device. The attention detection module processes the attention clue data to determine whether the attention level of the host wearer person is at a level where an image of a situation is likely to be of interest, and worth capturing. If so, the attention detection module generates a set of camera trigger signals 404 for activating capture of images by one or more image capture devices. This results in capturing with a camera a set of images 405 of a situation that has occurred and has raised the attention level of one or more persons wearing attention detection modules to a sufficient level such that the situation triggers capture of the image.

Figure 5:
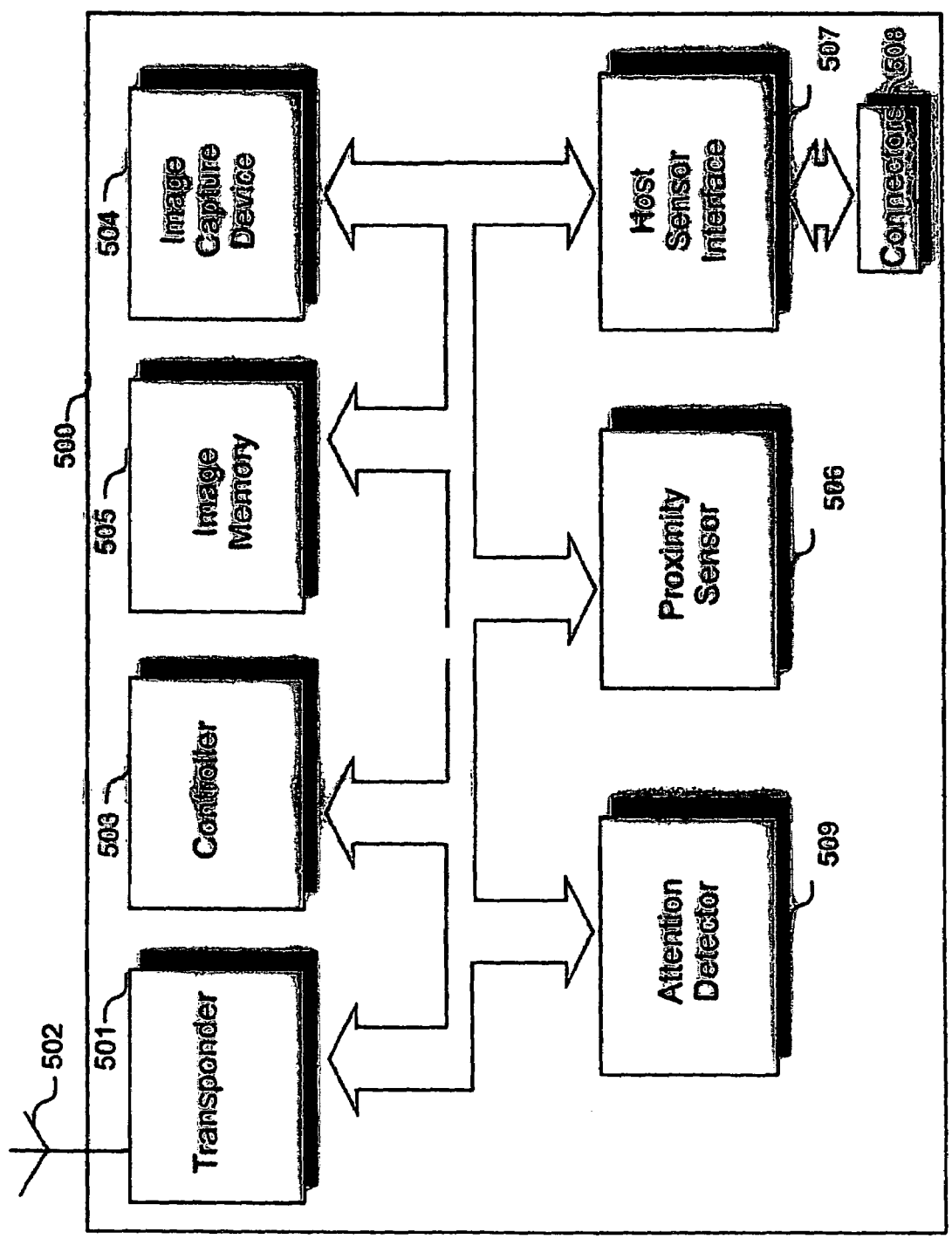
FIG. 5 is a block diagram of one embodiment of a people observer device.

FIG. 5 is a block diagram of components of a people-observing device 500. The people-observing device 500 comprises a transponder 501 and an antenna 502; a controller 503 for controlling the device 500; optionally, an image capture device 504 (e.g. a still or movie camera, preferably of the digital type) for capturing images of scenes; an image memory 505 for storing image data of images captured by the image capture device 504; a proximity sensor 506 for sensing when the people-observing device 500 is within range of one or more other people-observing devices and/or one or more attention detection modules; a host sensor interface 507 for receiving signals from a plurality of host sensors which may be worn by a host person wearing the people-observing device; a set of connectors 508 which can be used optionally for directly connecting one or more sensors to the host sensor interface; and an attention detector 509 for detecting attention clues of a host wearer, and/or one or more other persons.

First and second people-observing devices 500 can be provided with beacons to locate and detect each other, for enabling an exchange of information between the first and second people-observing devices. People-observing device 500 can be configured for recognizing at least one other people-observing device to form a group of people-observing devices which recognize each other. The people-observing device 500 is configured to communicate or not communicate with at least one other people-observing device, based on an analysis of contextual information relating to a host person, or an observed person. Such contextual information can comprise the location of a person, time of day, a local environment where the person finds himself, or like contextual information.

The people-observing device 500 can be configured to communicate or not communicate with at least one other people-observing device based on an analysis of a type of attention clue detected; for example, whether a short casual glance is exchanged with a person, or whether a longer glance is exchanged with a person.

The people-observing device 500 can also be set to communicate or not communicate with at least one of the attention detection modules depending upon the type of attention clue detected; for example a particular facial expression, a body posture type, a head direction, an eye gaze direction or an arm gesture.

Figure 6:
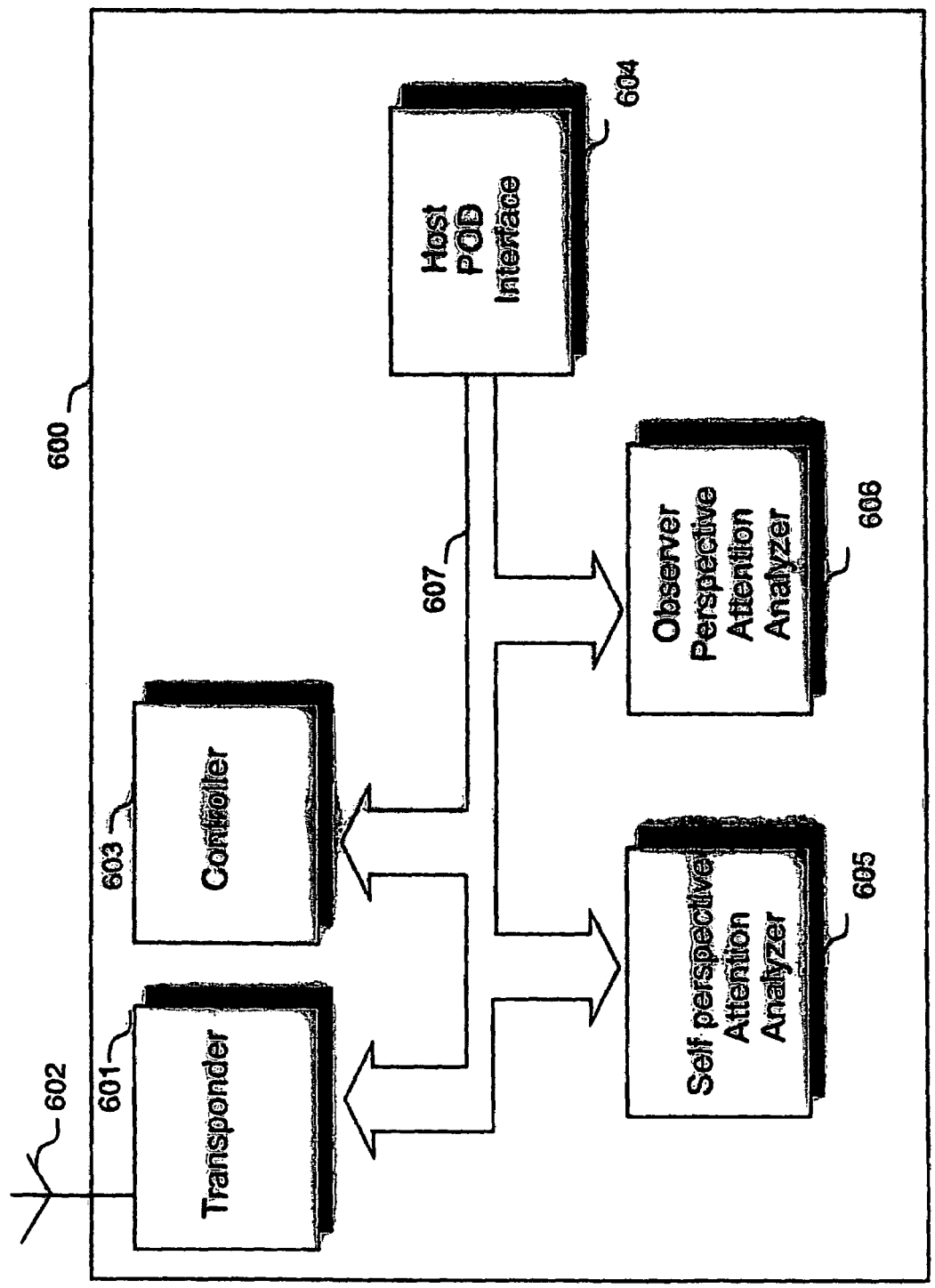
FIG. 6 is a block diagram of one embodiment of an attention detection module.

FIG. 6 is a block diagram of components of attention detection module (ADM) 600, functionally illustrated in FIG. 4. Module 600 comprises a transponder 601 and an antenna 602 for communicating with (1) one or more other attention detection modules, and (2) one or more people-observing devices; a controller 603; a host people-observing device interface 604 for interfacing with the people-observing device worn by the same host person who is wearing the attention detection module; a self perspective attention analyzer 605 for analyzing attention clues of the host wearer; an observer perspective analyzer 606 for analyzing attention clues observed of persons other than the host wearer person; and an internal data bus 607 connecting the above elements. It will be appreciated by persons skilled in the art that power supplies, casings, and like known components are also provided to create a practical manufactured unit.

The attention analyzers 605 and 606 comprise various components for detecting when the attention of a person or persons is raised. These components in analyzers 605 and 606 include components for detecting (1) facial expression of one or more persons, (2) eye direction of a person, (3) movement attitude of one or more persons, (4) body posture of one or more persons, and (5) context of an environment containing one or more persons.

In the foregoing embodiments, an attention detection module has been shown as being worn personally by a host wearer. The attention detection module is personal to a host wearer, in the sense that an attention detection module monitors (1) a host wearer and receives attention clues which have been collected from the perspective of the host wearer, and (2) attention clues concerning that host wearer which have been collected from the perspective of an observer who is not the host wearer. The physical location of the attention detection module is not restricted to being worn or personally carried by a host wearer; the module can be remote from the host wearer. However, an attention detection module is assigned to a host wearer for detecting an attention status of that host wearer, and therefore in that sense is personal to that host wearer. However in a preferred embodiment, an attention detection module is carried or worn by a host wearer.

Figure 7:
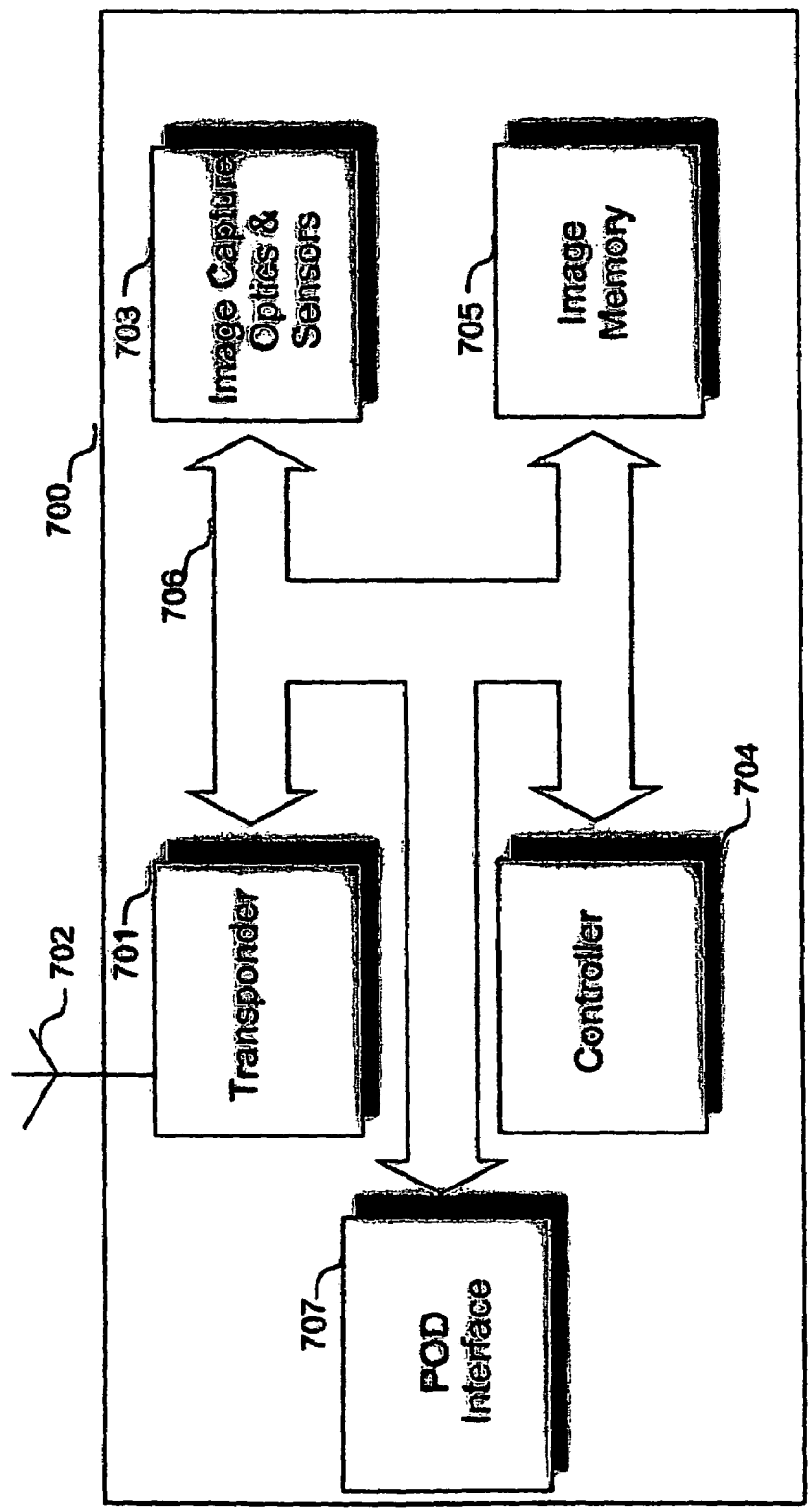
FIG. 7 is a block diagram of one embodiment of an image capture device.

FIG. 7 is a block diagram of components of image capture device 700. Image capture device 700 comprises a transponder 701 and an associated antenna 702; a set of image capture optics and sensors 703, for example a charge coupled device (CCD) array; a controller 704; an image memory 705 for storing image data; an internal bus 706; and a people observing device (POD) interface 707, for connecting to a local people-observing device. The local POD and the image capture device are worn by the same host user.

The image capture device 700 is capable of receiving trigger signals from one or more attention detection modules, over a wireless link using the antenna 702 and transponder 701. Activation of the image capture 700 device causes the device to capture an image or image sequence. Device 700 stores the captured image or image sequence in the image memory 705 under control of the controller 704.

The image capture device 700 can also be a monitoring sensor for collecting 2-dimensional images of one or more persons, for input into a people-observing device. In the embodiments shown, the capture image data can be transmitted over the wireless link via the antenna 702 and transponder 701 to a remote people-observing device.

It will be appreciated by the person skilled in the art that although a people-observing device 500, attention detection module 600, and an image capture device 700 are illustrated in FIGS. 5 to 7 herein as stand alone discrete entities, each capable of communicating with each other via a wireless link, these three components can be integrated into a single physical device, or combinations of the components can be integrated into one or more physical devices. If the components are integrated into a single physical device, such single physical device can be worn by a single host person.

In an embodiment where the people-observing device and the image capture device are both worn by a wearer, the image data can be made available directly to the people-observing device via an internal bus or an interface.

Figure 8:
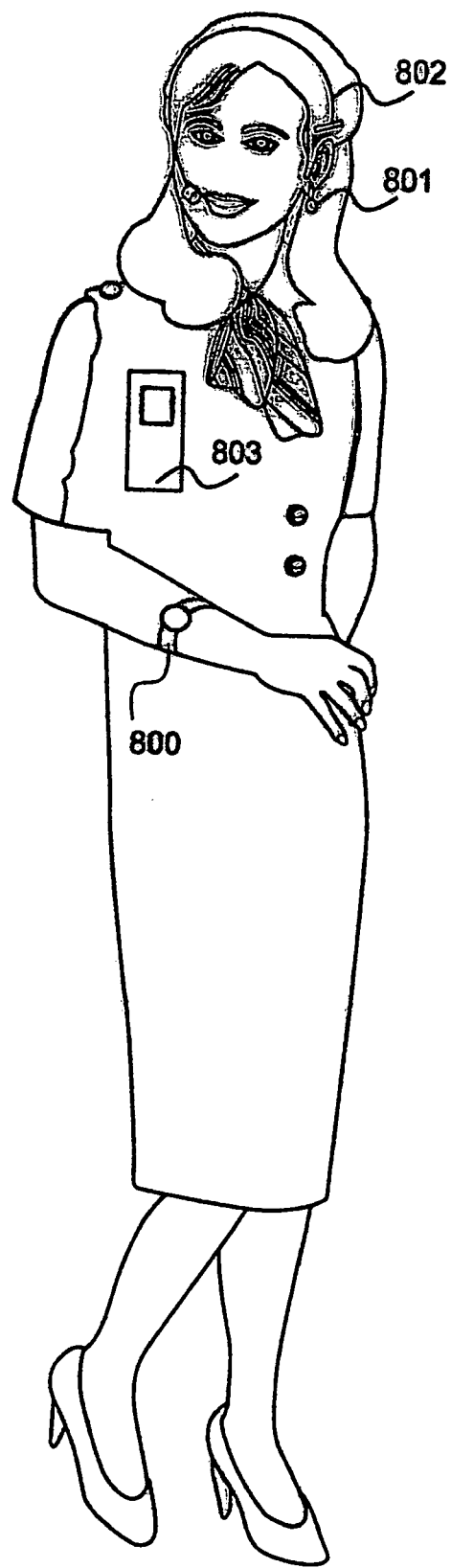
FIG. 8 is a schematic illustration of an exemplary subject with various sensor types according to the specific embodiment of the image capture system.

FIG. 8 is a schematic illustration of a host person wearing a set of personal sensors for detecting body language exhibited by that host person. Sensor types include the following:

Motion sensors for detecting the motion of a limb of the host person, for example raising of an arm, rotation of the head or the like. The motion sensor can take the form of a wrist strap 800 containing a small gyroscope, for example a laser gyroscope, or a fibre optic gyroscope. Alternatively, the motion sensor can be in the form of a jewelry item, for example an earring or ear stud 801 for detecting rapid head rotation. The motion sensor can also include an accelerometer. Motion sensors can also be worn or attached to other clothing items, for example included in the sole of a shoe or other footwear.

Temperature sensors: Temperature sensors for measuring skin temperature or other body temperature can be jewelry items worn in contact with the skin, for example as a wrist watch or bracelet. Temperature sensors can be included within clothing worn next to a person's skin, for example as thin conductive strips woven into material which a person wears.

Voice detectors and sound detectors. A sound detector can be provided in the people-observing device itself, or worn externally as a headset 802 having a microphone positioned near the mouth of the host person.

Two-dimensional image sensors: An image capture device itself, i.e., camera 803 can be a sensor. For example the image capture device can capture an image of a person other than the host person wearing the image capture device, or a general scene external to a host person wearing the image capture device.

There is now described in further detail various elements of the image capture system. In some cases, the elements described are specific to a particular embodiment of the image capture system, and it will be appreciated by persons skilled in the art that variations in the precise arrangement of the various elements described can be made.

Figure 9:
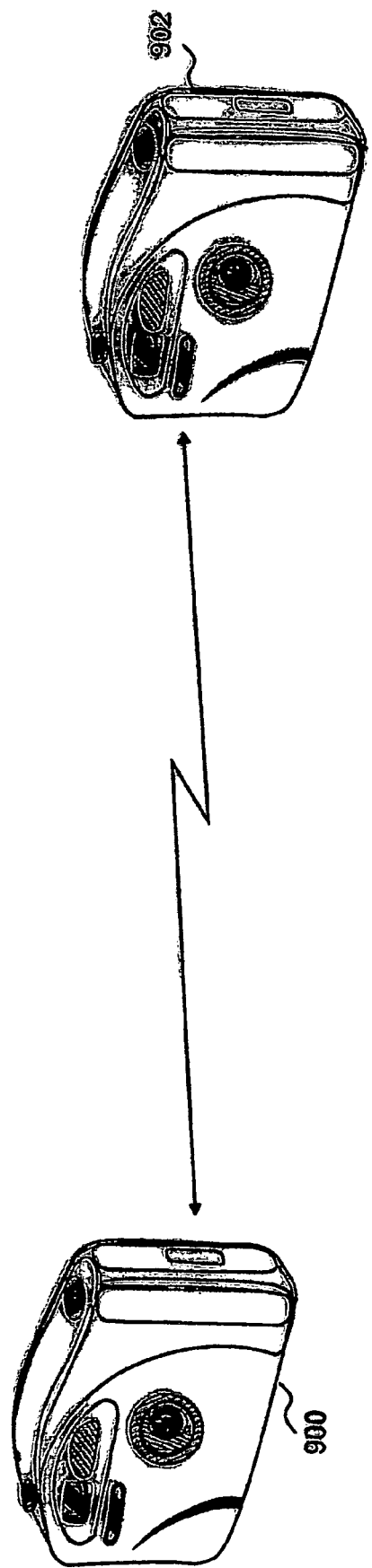
FIG. 9 is a schematic illustration of a specific embodiment of an image capture system comprising two portable devices, each comprising an image capture device, a people observer device and an attention detection module.

Referring to FIG. 9 herein, there is shown schematically an image capture system comprising two portable camera units 900 and 902. Each of camera units 900 and 902 includes an image capture device; a people-observing device; and an attention detection module, included in a single portable and battery powered casing that can be worn, carried or held by a person.

There are now described various aspects of operation of the image capture system described with reference to FIGS. 1-9.

Figure 10:
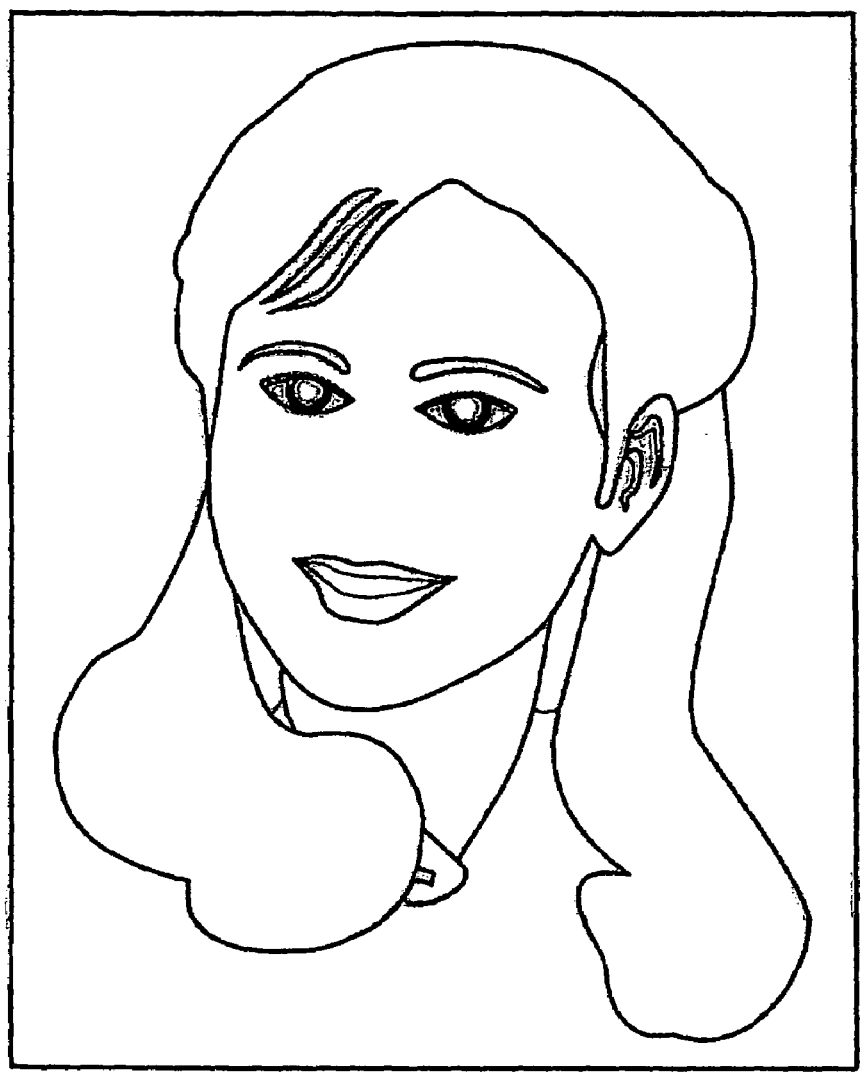
FIG. 10 is a schematic illustration of a two dimensional analyzed captured digital image of a person according to a specific method.

FIG. 10 is an illustration of a still image captured by an image capture device, from which an attention clue can be abstracted. The image of FIG. 10 includes a person having a facial expression, i.e., a smile or laugh. The image capture device captures a 2-dimensional image, which is processed by attention detection module 600.

The two dimensional image is typically converted into a bitmap. Algorithms are applied to the bitmap for (1) edge detection to detect edges of features, and (2) detection of human faces or human outlines. These algorithms can be resident in either a people-observing device or an attention detection module. Facial expressions can be detected, by (1) detecting a set of edges, and then (2) comparing the set of detected edges, or points on those edges, with a predetermined library of edges or points corresponding to a person's smiling or laughing facial expression.

Figure 11:
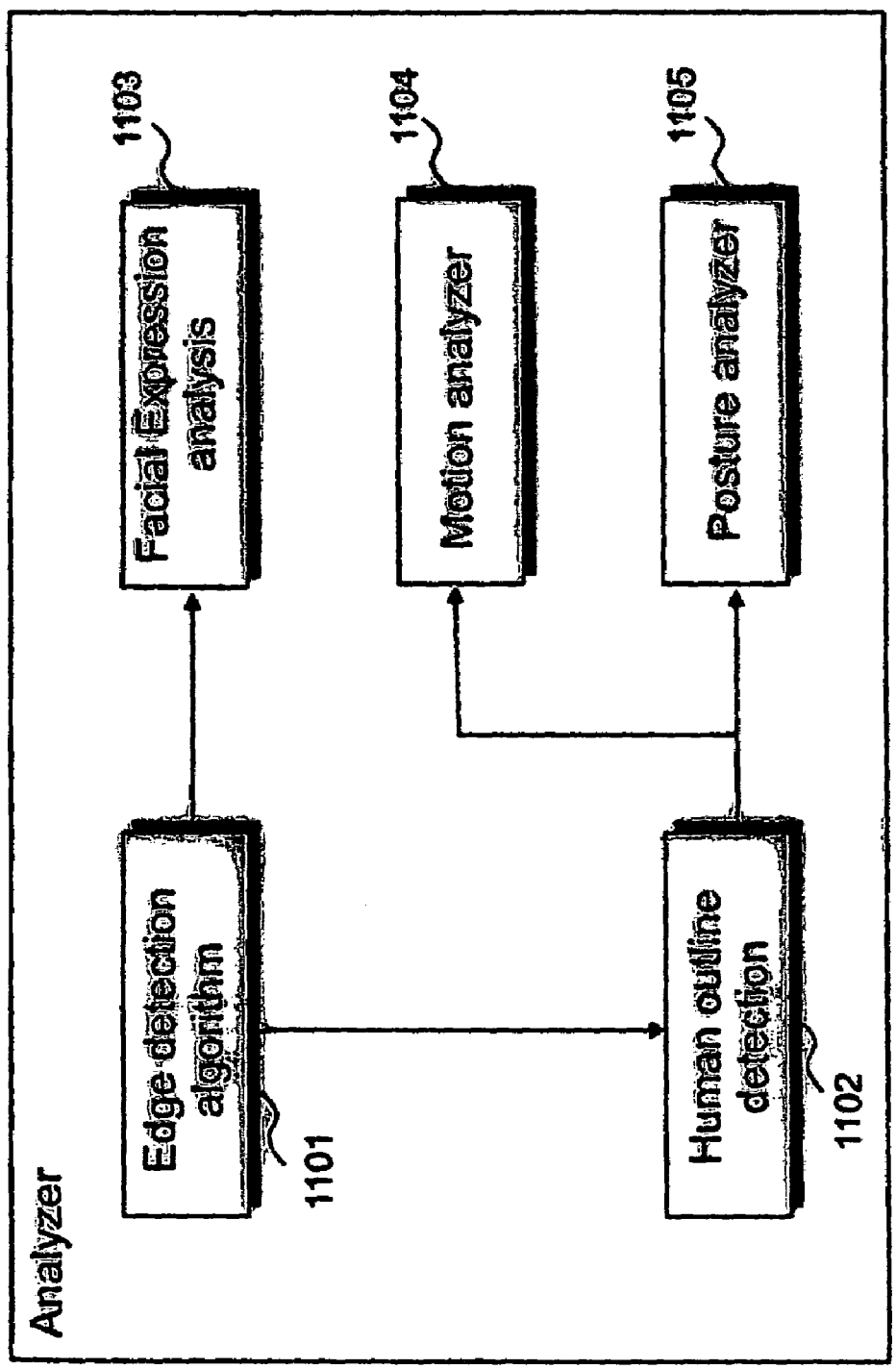
FIG. 11 is a block diagram of a specific embodiment of an analyzer component of an attention detection module.

The attention detection module comprises a self perspective attention analyzer and an observer perspective attention analyzer. Referring to FIG. 11 herein, the self perspective and observer perspective attention analyzers can share attention detection components, such as common image processing components for processing two dimensional images. The image processing components include edge detection algorithm 1101 for detecting edges within a two dimensional image; a human outline detector component 1102 for detecting a human outline in a two dimensional image frame, or a sequence of two dimensional image frames; a facial expression analysis component 1103 for detecting various facial expressions, for example dilated pupils, a smile, a surprise expression and like expressions which indicate that the attention of a human has been noticed by a subject; a motion analyzer component 1104 for analyzing motion from a sequence of two dimensional images; and a posture analyzer component 1105 for analyzing the posture of a human being from a two dimensional image or a sequence of two dimensional images.

Each of the components of FIG. 11 can be provided by (1) a general purpose computer, under control of an application, or (2) firmware, for example in an application specific integrated circuit (ASIC), in which case the analyzer component can be made small enough to be portable and worn by a host human.

The attention detection module, in determining whether a person's state of attention has been raised sufficiently to activate capture of data on behalf of that person, takes into account attention clues collected from a self perspective, and attention clues detected from an observer perspective. However, the attention detection module does not necessarily need to give each type of attention clue an equal weighting, in determining whether a host person's attention has been raised. Depending upon the type of attention clue, and other factors, including for example an environment in which the host person finds himself, a disproportional higher amount of weighting can be given either to self perspective attention clues, or observer perspective attention clues.

Figure 12:
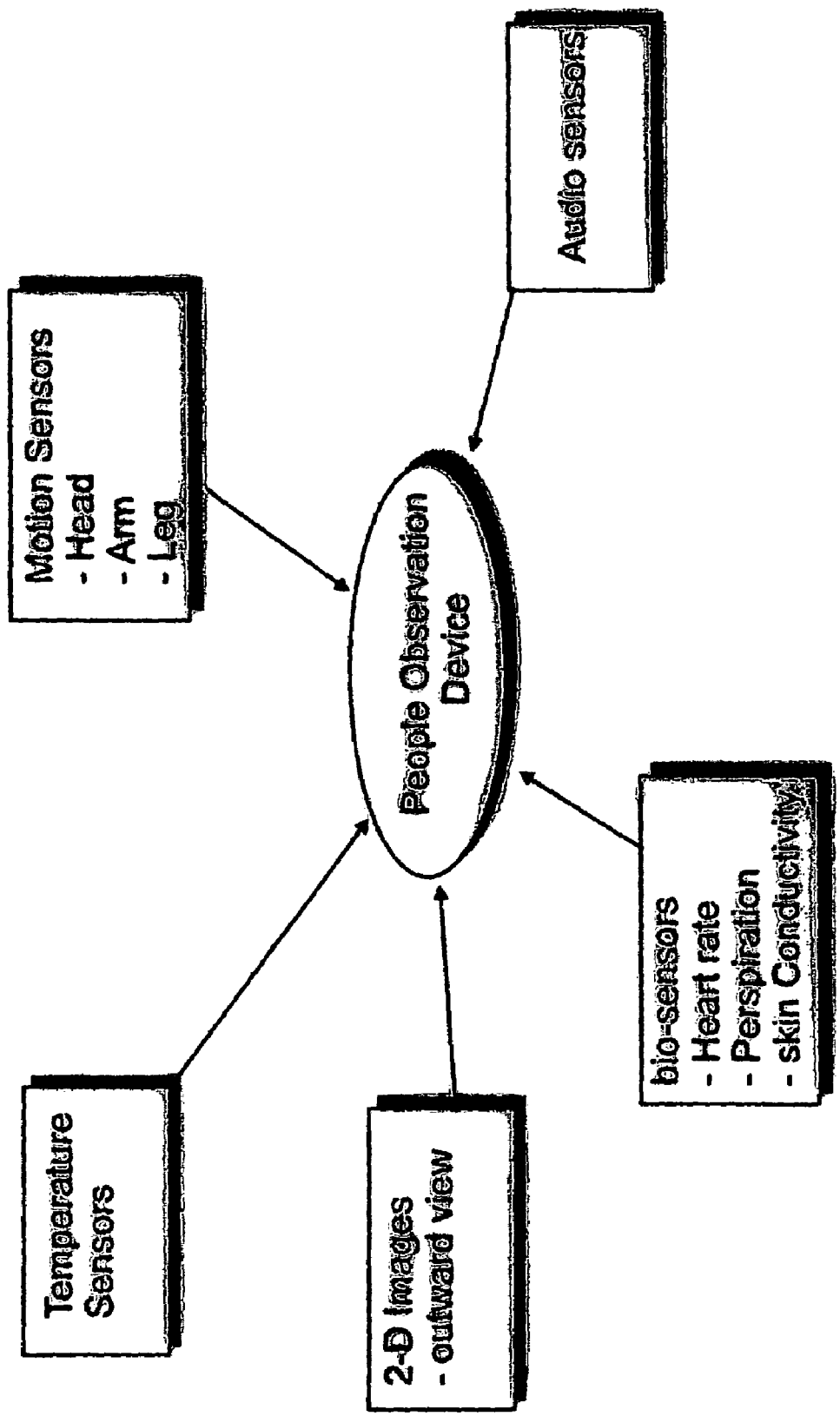
FIG. 12 is a block diagram of sensor inputs to a person observation device in a self perspective mode of operation of an image capture system.

FIG. 12 is a schematic diagram of a set of sensors feeding instructions to a people observation device. The sensors can be incorporated integrally with the people observation device, or be provided externally to the people observation device, and send signals to the people observation device. Sensor types include the following:

- temperature sensors for sensing skin temperature of a host person carrying the sensor;
- an image capture device, for example a charge couple delay device for capturing images in a self perspective mode of a scene, which can typically include other people;
- a set of biosensors, including a heart rate monitor, a perspiration monitoring sensor, a skin conductivity monitoring sensor;
- one or more motion sensors for sensing parameters such as head rotation, arm movement and leg movement; and
- one or more audio sensors, for example a microphone.

Each of the sensors feeds sensor signals to the people observation device. The people observation device processes the sensor signals, into a form to enable the signal to be analyzed by the attention detection module.

The detector device of the image capture system can be operated in various modes of operation including a self perspective mode, or an observer perspective mode. Each of these modes of operation requires a different configuration of the components of the system.

The modes function as follows:

In the self perspective mode of operation, the attention of a person is activated from the perspective of a host person carrying an image capture device. The host person may become interested in various aspects of his environment. For example, the person may look at an airplane in the sky, or may turn around to look at a passing person, or may have his attention attracted by an event, for example a load bang, a car crash or some other distracting event in the person's immediate surroundings. Sensors carried by the person monitor the host person's body language. A people-observing device carried by the host person receives signals from the sensors, and generates attention clue signals. The attention clue signals comprise signals from the sensors at various levels of data processing. For example a two dimensional image data might have very little processing, and may undergo almost no processing of the information content of the signal prior to being forwarded to the attention detection module. Information in an audio signal may be processed before being presented to the attention detection module. For example the audio signal may be filtered such that only audio signals above a predetermined amplitude are passed to the attention detection module, with normal background environment signals at a relatively low level of loudness being filtered out by the people-observing device. The level of information processing to be applied to the sensor signals before those signals are passed to the attention detection module is a function of a specific design parameter which can be varied from system to system.

In the self perspective mode, the attention detection module receives signals from the host person. The signals from the host person represent the body language of the host person, to which the attention detection module is assigned to monitor, that is, represent information describing an attention level from the perspective of the host person. The ADM analyzes these self perspective attention clues. As a result of the analysis by the ADM, the ADM generates an image capture signal for activating an image capture device worn by the host person when the ADM determines that the attention of the host person is raised to such a level that there is a significant or interesting event in the host person's immediate environment to capture an image in the environment.

In an observer perspective mode, one or more people-observing devices observe persons other than the host person wearing the people-observing device. For example where first and second host persons each carry first and second corresponding respective people-observing devices, and each carries a corresponding attention detection module, a first people-observing device of a first host person might observe the second person. Observation can take one of the forms mentioned above, for example continuous monitoring of a moving captured image of the second person. Upon detecting a significant sensed parameter, the first people-observing device generates an attention clue signal which is processed by the first attention detection module carried by the host person. Attention clues relate to the second person, rather than the first host person.

The first attention detection module, having determined that the second person's level of attention is raised to a high level, sends signals to the first image capture device worn by the first person, and/or an activation signal to the second image capture device worn by the second person. The signals cause either one or both of those devices to capture a corresponding respective image.

Conversely, the second people-observing device worn by the second person monitors the attention of the first person or any third person in the environment. The second people-observing device, having observed behavior of the first person, generates attention clues which it sends to the second attention detection module. The second attention detection module analyses those attention clues and, where appropriate, generates one or more trigger signals and sends the trigger signal(s) to the second image capture device and/or first image capture device to trigger capturing of an image or image sequence by the second and/or first image capture devices.

Figure 13:
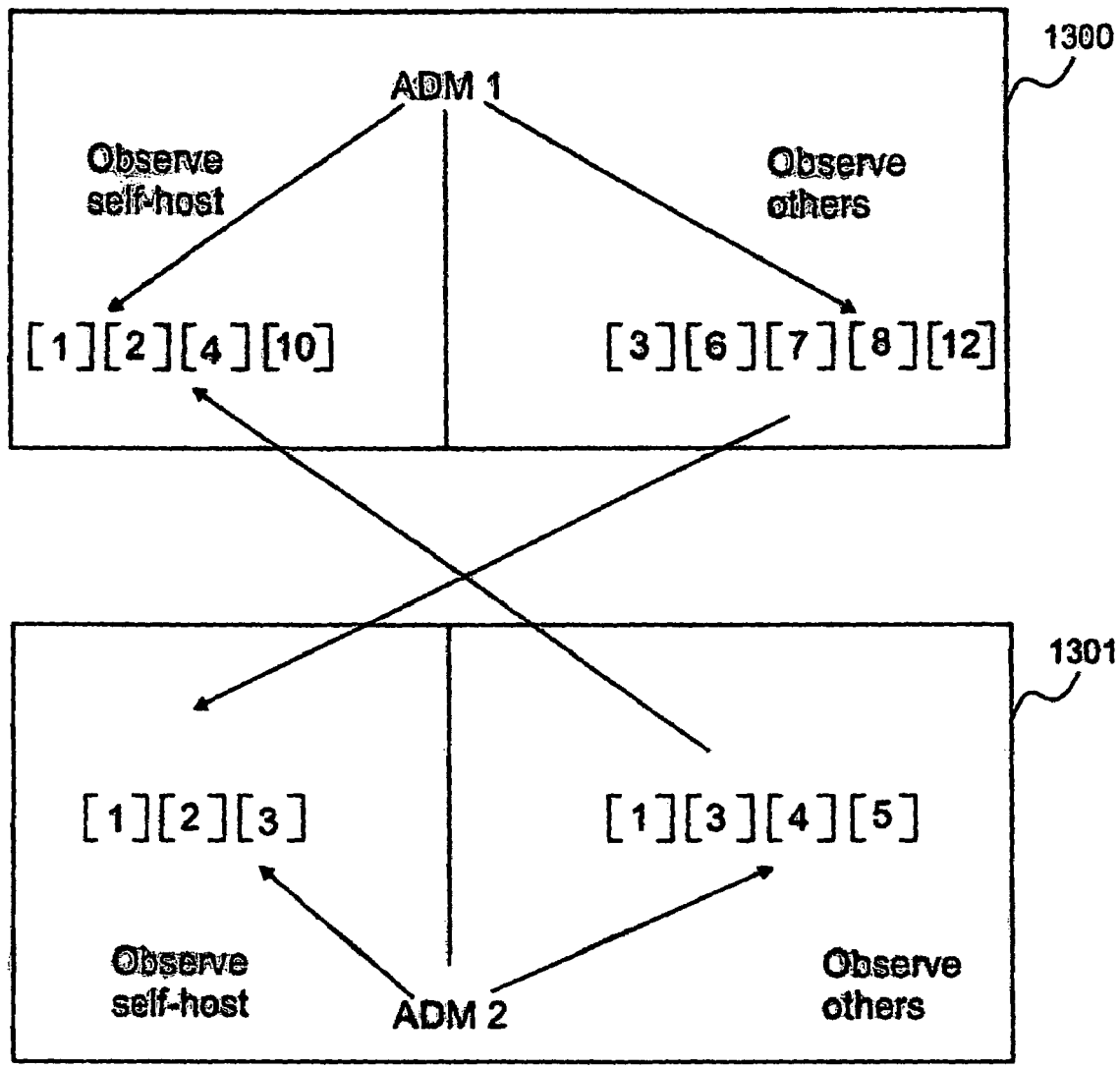
FIG. 13 is a flow diagram of the interaction between first and second attention detection modules each operating in a self-perspective mode and in an observer mode.

FIG. 13 is a schematic illustration of the interaction between first and second attention detection modules 1300, 1301, respectively worn by first and second host persons.

First attention detection module 1300 performs attention detection processes 1, 2, 4, 10 based on a plurality of attention clue signals, 1, 2, 4, 10 respectively. The first attention detection module 1300 receives from the second attention detection module 130 data which are collected in an observer perspective mode by the second attention detection module. The second attention detection module 1301 monitors the first host person, and upon detecting an attention clue of the first host person, signals to the first attention detection monitor 1300 information concerning the first host person. The information concerning the first host person is analyzed by the self perspective analyzer of the first attention detection module 1300.

Conversely, first attention detection module 1300 monitors the second person. Module 1300, upon detecting an attention clue of the second person, signals to the second attention detection monitor 1301 attention clues concerning the second person. The second attention detection monitor 1301 incorporates the information received from the first attention detection monitor, in a self perspective analysis mode of the second attention detection monitor. The second detection monitor 1301 analyses attention clues of the second host person to determine whether an image signal should be generated for capturing an image using the second person's image capture device.

The invention claimed is:

1. An attention detection system comprising:
    at least one first sensor device, located at a host wearer, for generating a host perspective signal relating to attention clues indicative of the attention of the host wearer to an observer; and
    at least one second sensor device, located at the observer, for generating an observer perspective signal relating to attention clues indicative of the attention of the observer to the host wearer; and
    a portable attention detector for receiving the host perspective and the observer perspective signals and for determining a situation of raised attention of said host wearer from said received host perspective signal and said received observer perspective signal.

2. The attention detection system as claimed in claim 1, wherein said at least one first sensor device comprises:
    an image capture device for capturing an image from the self-perspective of said host wearer in response to the determined situation of raised attention.

3. The system as claimed in claim 1, wherein said at least one first sensor device is adapted to be worn by said host wearer.

4. The system as claimed in claim 1, wherein said at least one second sensor device is adapted to be worn by the observer.

5. The system as claimed in claim 1, wherein said at least one second sensor device is adapted to be located in a place where said host wearer is likely to be.

6. The system as claimed in claim 1, further comprising a people-observing device for communicating with said attention detector.

7. The system as claimed in claim 6, further comprising a plurality of the people-observing devices, each of which is capable of:
    communicating with said attention detector; and
    communicating with each other.

8. The system as claimed in claim 7, wherein at least one of the people-observing devices comprises a camera device.

9. The system as claimed in claim 1 further comprising first and second user-observing devices, including beacons for locating and detecting the host wearer and the observer.

10. The system as claimed in claim 1, wherein the portable attention detector and at least one first sensor device are integrated into a host wearable device.

11. The system as claimed in claim 1, further comprising a people-observing device for communicating with said attention detector, wherein said people-observing device is configurable for cooperating with at least one other people-observing device for communicating information with said at least one other people-observing device.

12. The system as claimed in claim 1, further comprising a people-observing device for communicating with said attention detector, wherein said people-observing device is configurable for recognizing at least one other people-observing device to form a group of people-observing devices capable of recognizing each other.

13. The system as claimed in claim 12, wherein said people-observing device can be set to communicate or not communicate with at least one other people-observing device based on an analysis of contextual information relating to the host wearer.

14. The system as claimed in claim 1, further comprising a people-observing device configured to be set to selectively communicate with at least one other people-observing device based on an analysis of a type of attention clue detected.

15. The system as claimed in claim 1, further comprising at least one people-observing device configured to be set to selectively communicate with said attention detector depending upon the type of attention clue detected.

16. The system as claimed in claim 1, wherein at least one of the first sensor device and the second sensor device comprises a digital camera device for capturing a digital image.

17. The system as claimed in claim 1, wherein the at least one first sensor device is arranged for detecting a facial expression of said host wearer and for generating the host perspective signal based on the detected facial expression of said host wearer.

18. The system as claimed in claim 1, wherein the at least one first sensor device is arranged for detecting an eye direction of said host wearer and for generating the host perspective signal based on the detected eye direction of said host wearer.

19. The system as claimed in claim 1, wherein the at least one first sensor device is arranged for detecting body language of said host wearer and for generating the host perspective signal based on the detected body language of said host wearer.

20. The system as claimed in claim 1, wherein the at least one first sensor device is arranged for detecting body posture of the host wearer and for generating the host perspective signal based on the detected body posture of the host wearer.

21. The system as claimed in claim 1, wherein the first sensor device or the second sensor device or both sensor devices include a detector for the context of an environment where said host wearer is located, the host perspective signal or the observer perspective signal or both, as appropriate, being dependent on the context of the environment where said host wearer is located.

22. The system as claimed in claim 1 wherein the first sensor device or the second sensor device or both sensor devices include a vocal utterance detector of the host wearer, the host perspective signal or the observer perspective signal or both, as appropriate, being dependent on the vocal utterance detector of the host wearer.

23. A method of capturing images using at least one camera device, said method comprising:
    detecting an attention clue exhibited by at least one first animate object from the perspective of a host second animate object carrying said at least one camera device, said attention clue being captured by said at least one camera device and indicating that the first animate object pays attention to the second animate object;
    detecting an attention clue of said second animate object from an observer perspective of the at least one first animate object external of said second animate object;
    activating said at least one camera device so it captures an image of a subject related to the at least one first animate object in response to detection of said attention clues of the first and second animate objects.

24. The method as claimed in claim 23, wherein said step of detecting an attention clue exhibited by the at least one first animate object comprises detecting a facial expression of said at least one first animate object.

25. The method as claimed in claim 23, wherein said step of detecting an attention clue exhibited by the at least one first animate object comprises detecting an eye direction of said at least one first animate object.

26. The method as claimed in claim 23, wherein said step of detecting an attention clue exhibited by the at least one first animate object comprises detecting body language of said at least one first animate object.

27. The method as claimed in claim 23, wherein said step of detecting an attention clue exhibited by the at least one first animate object comprises detecting body posture of said at least one first animate object.

28. The method as claimed in claim 23, wherein said step of detecting an attention clue exhibited by the at least one first animate object comprises detecting a vocal utterance of said at least one first animate object.

29. The method as claimed in claim 23, wherein the detecting step of the attention clue of said second animate object comprises:
    capturing an image from the perspective of the at least one first animate object external to the second animated object; and
    performing image processing of said image so there is detected an attention clue of said second animate object, the detected image of the attention clue of the second animate object being selected from the set including:
    a facial expression;
    an eye direction;
    a body movement; and
    a body posture.

30. A device for observing at least one first animate object comprising:
    an interface for interfacing with at least one sensor device for deriving a first signal indicative of an attention state of the first animate object;
    a receiver for a sensor signal representing aspects of body language of the first animate object, the aspects being observed from a position external of said first animate object; and
    an analyzer for determining from said first signal and said sensor signal at least one attention clue related to a second animate object observing the first animate object; and
    a transmitter for transmitting the attention clue signals.

31. The device as claimed in claim 30, further comprising:
    a transponder device adapted to be carried by the first animate object for transmitting said sensor signals to a location displaced from the first animate object.

32. The device as claimed in claim 30, wherein the sensor signal receiver includes:
    an image capture device for capturing image frames including aspects of the body language of the first animate object.

33. An attention detection component for determining a level of attention of a host wearer, said component comprising:
    a self perspective attention analyzer for analyzing attention clues of the host wearer toward an observer; and
    an observer perspective attention analyzer for analyzing attention clues of the observer toward the host wearer from an observed perspective of the host wearer;
    wherein the self and observer perspective attention analyzers determine from the attention clues a level of interest of the host wearer, the attention detection component being operable for analyzing said attention clues in a self perspective mode, in which said attention clues relate to the host wearer.

34. The attention detection component as claimed in claim 33, the component being operable in an observer perspective mode, in which said attention clues represent signals describing behavior of the observer observed by the host wearer from a remote location.

35. The attention detection component as claimed in claim 33, comprising a transponder device for receiving said attention clue signals from a remote sender device.

36. A computer readable storage medium storing a computer program for causing a computer to perform steps comprising:
   analyzing a plurality of sensor signals representing attention clues collected from a self perspective of a first animate object toward a second animate object, and attention clues from the second animate object toward the first animate object collected from an observed perspective of said first animate object, and determining from said sensor signals and collected attention clues, a behavioral mode of the first animate object; and
   generating an image capture Trigger signal for triggering an image capture device to capture image data, in response to said sensed behavioral mode of said first animate object.

37. An attention detection system comprising:
   a portable attention detector for receiving attention clues toward an observer generated from a self perspective of a host wearer of said attention detector;
   an animate object observing device for observing said host wearer from an observer perspective of the observer external of said host wearer and determining attention clues of said host wearer from said observer perspective externally of said host wearer;
   said attention detector being capable of determining a situation of raised attention of said host wearer from said self perspective attention clues, and said received observer perspective attention clues.

38. A system for detecting the attention level of a first animate object comprising:
   a first sensor for generating a first signal relating to the attention level of the first animate object to a second animate object from the perspective of the first animate object;
   a second sensor for generating a second signal relating to the attention level toward the first animate object from a perspective of the second animate object; and
   a processor for determining that the first animate object has a raised attention level in response to the first and second signals.

39. The system of claim 38 wherein the second sensor is arranged to respond to a parameter indicative of the attention being paid to the first animate object by the second animate object.

40. The system of claim 39 wherein the first and second sensors are adapted to be carried by the first animate object.

41. The system of claim 40 wherein the second sensor comprises an image detector adapted to be responsive to at least a portion of an image of the second animate object.

42. The system of claim 39 wherein the first and second sensors are respectively adapted to be carried by the first and second animate objects.

43. The system of claim 42 wherein the second sensor is connected to a transmitter (a) adapted to be carried by the second animate object, and (b) arranged to transmit the second signal from the second animate object to the first animate object.

44. The system of claim 38 wherein the first sensor is arranged to respond to a parameter indicative of the reaction of the first animate object to the environment where the first animate object is located.

45. The system of claim 44 wherein the second sensor is adapted to be located at a position removed from the first animate object, and further comprising a transmitter arranged to transmit the second signal from said position to a receiver (a) arranged to receive the second signal, and (b) adapted to be carried by the first animate object.

46. A method of detecting an attention level of a first animate object comprising:
   sensing a first attention level of the first animate object toward a second animate object from the perspective of the first animate object;
   sensing a second attention level to the first animate object from a perspective of the second animate object; and
   determining that the first animate object has a raised attention level in response to the sensed first and second attention levels.

47. The method of claim 46 wherein the second attention level is generated in response to a parameter indicative of the attention being paid to the first animate object by a second animate object.

48. The method of claim 47 wherein the sensing of the first attention level is by a first sensor carried by the first animate object.

49. The method of claim 48 wherein the sensor comprises an image detector responsive to at least a portion of an image of the second animate object.

50. The method of claim 48 wherein the sensing of the second attention level is by a second sensor carried by the second animate object.

51. The method of claim 50 further comprising transmitting the second signal from the second animate object to the first animate object.

52. The method of claim 46 wherein the sensing of the first attention level responds to a parameter indicative of the reaction of the first animate object to the environment where the first animate object is located.

53. The method of claim 50 wherein the second sensor is located at a position removed from the first animate object, and further comprising transmitting the second signal from said position to a receiver that receives the second signal and is carried by the first animate object.

* * * * *